(No Model.) 2 Sheets—Sheet 2.

W. C. STILES.
CRUSHING AND GRINDING MILL.

No. 326,253. Patented Sept. 15, 1885.

Witnesses,
Geo. H. Strong.

Inventor,
W. C. Stiles
By Dewey & Co.
Attorneys

UNITED STATES PATENT OFFICE.

WILLIAM C. STILES, OF SAN FRANCISCO, CALIFORNIA.

CRUSHING AND GRINDING MILL.

SPECIFICATION forming part of Letters Patent No. 326,253, dated September 15, 1885.

Application filed April 24, 1884. (No model.)

*To all whom it may concern:*

Be it known that I, WILLIAM C. STILES, of the city and county of San Francisco, and State of California, have invented an Improvement in Crushing and Grinding Mills; and I hereby declare the following to be a full, clear, and exact description thereof.

My invention relates to that class of grinding-mills employing conical corrugated disks mounted upon parallel shafts, two cones being placed back to back upon one shaft and revolving between two other conical disks mounted upon the other shaft, so as to revolve close to the faces of the double cone; and my invention consists in the novel construction and combination of devices, to be hereinafter more fully set forth, and pointed out in the claim.

Figure 1:
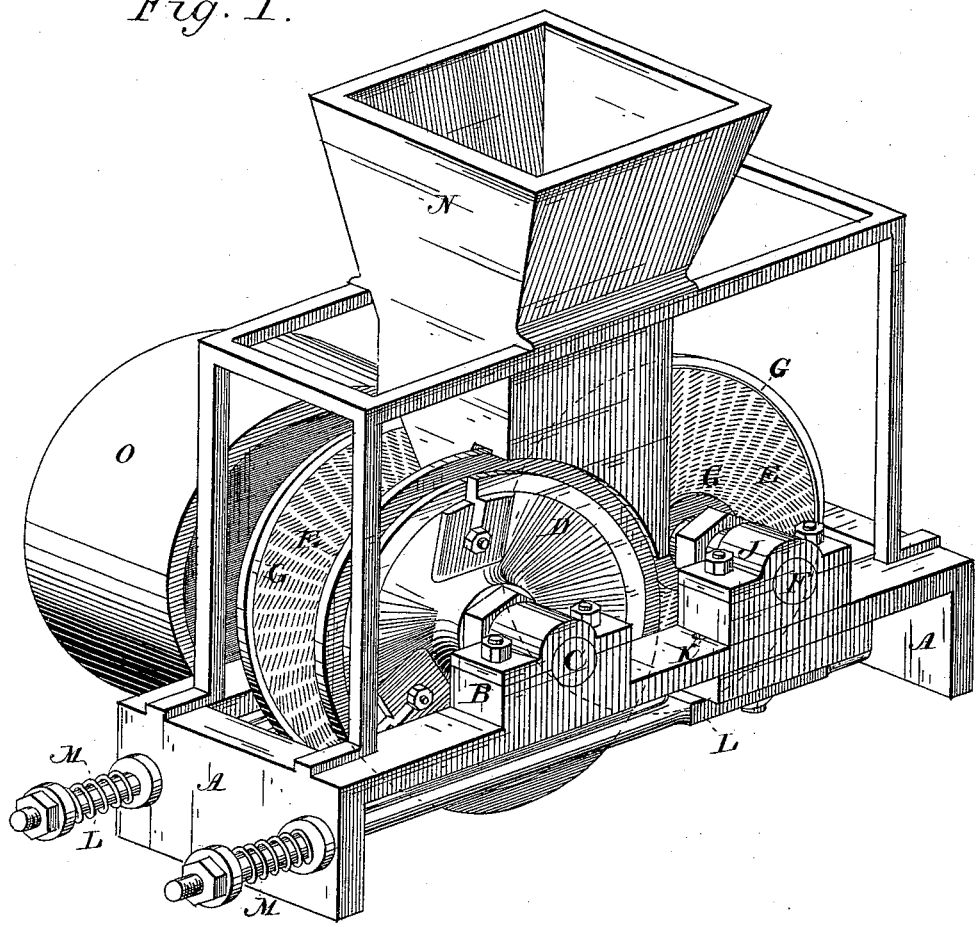
Figure 2:
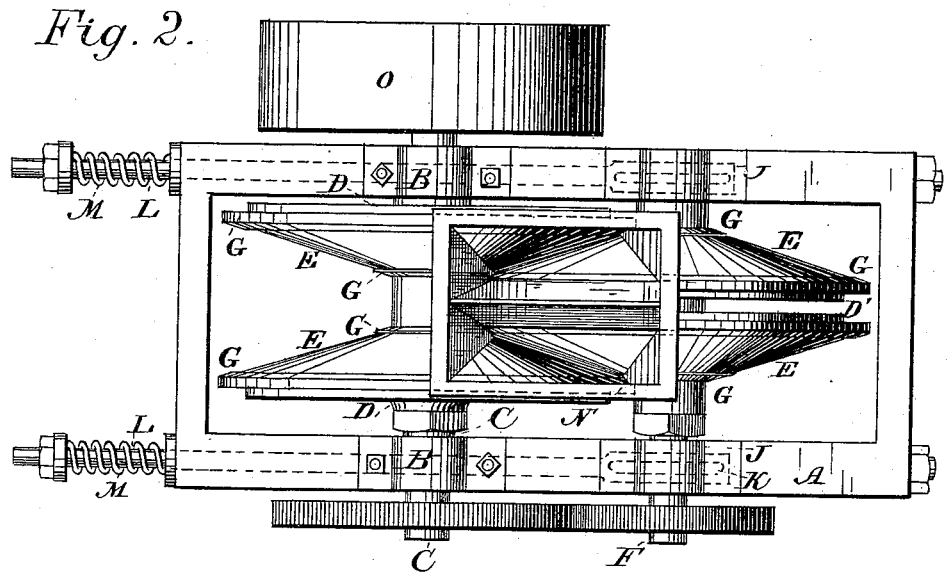
Figure 3:
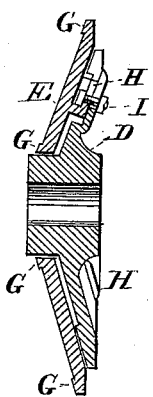
Figure 4:
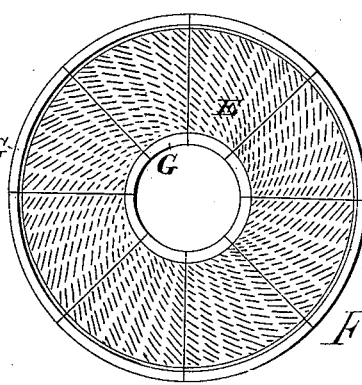
Figure 5:
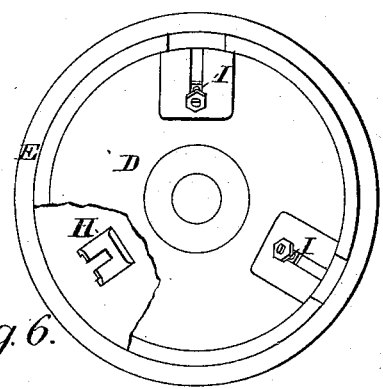
Figure 6:
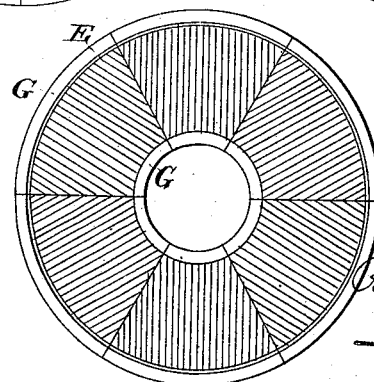

Referring to the accompanying drawings for a more complete explanation of my invention, Figure 1 is a perspective view of my mill. Fig. 2 is a top view of the same. Figs. 3, 4, 5, and 6 are detailed views of the disks and grinding-surfaces.

A is a frame of any suitable form and dimensions to support my apparatus.

B B are boxes fixed to the sides of the frame to support the shaft C, upon which are fixed the disks D, having conical faces, the apexes of which converge toward the shaft. Upon these conical-faced disks are fixed the sections E, the inner faces of which are ridged, fluted, corrugated, or otherwise roughened to form grinding-surfaces.

The shaft F has disks D', with sections E, similar to D; but on these the apexes of the conical faces diverge from each other as they extend toward their shaft, and their bases are close together. The disks D are sufficiently separated to allow the double cone upon the other shaft to fit between them, as shown. The angles of the conical faces being the same, it will be manifest that those upon the disks D' will fit between those upon the disks D, the contiguous faces running parallel with each other.

In order to prevent the ridges or corrugations upon these grinding-surfaces from coming into contact with each other, if the cones should be adjusted so as to touch, narrow flanges G are formed around the exterior and interior edges of the grinding-sections, and a little higher than the corrugations, so that these flanges will touch and prevent the corrugations from rubbing against each other.

The grinding-sections may be formed of steel or any other suitable metal or substance which is hard enough for the purpose, and they have projections H cast upon the backs with slots and chambers, into which the heads of bolts may be inserted. These bolts I extend through slots in the disks, and nuts upon their outer ends are screwed up until the grinding-sections are firmly fixed. The disks may be provided with as many sections as desired, and any one or more may be removed or replaced at pleasure.

The boxes J, in which the shaft F turns, have lugs which pass downward through slots K in the frame A, and through holes in the rods or bars L beneath, to which they are secured. These bars extend horizontally beneath the frame A and through holes in its end, by which they are guided and held in place.

Strong springs M act upon the ends of the bars which project beyond the end of the frame, and thus draw them, with the boxes J and the double cone D', toward the cones between which it travels. If any hard, unyielding substance should pass between the cones, the springs would allow them to separate until it passed.

Material to be pulverized is fed into a hopper, N, and discharged from it between the contiguous surfaces of the cones by any well-known means, either upon one or both sides, and is discharged below after being ground.

A pulley, O, is fixed to the shaft C, and through it motion is communicated to the shaft and its cones, while the other cone is driven by the friction created by the passing material, or by direct gearing, as shown.

Having thus described my invention, what I claim as new, and desire to secure by Letters Patent, is—

The parallel shafts C and F and the conical-faced disks D D D', arranged as described, and having their faces opposing and passing each other as they move in the same direction, said disks having removable grinding-surfaces in sections, formed with exterior and central smooth portions and intermediate corrugated portions, in combination with means for moving one shaft to or from the other, whereby the grinding-faces are caused to approach to or recede from each other, substantially as herein described.

In witness whereof I have hereunto set my hand.

WILLIAM C. STILES.

Witnesses:
H. C. LEE,
S. H. NOURSE.